United States Patent [19]
Bracke

[11] 3,852,259
[45] Dec. 3, 1974

[54] PHOSPHATES OF PYRAZOLE POLYMERS
[75] Inventor: William J. I. Bracke, Hamme, Belgium
[73] Assignee: Labotina, S.A., Brussels, Belgium
[22] Filed: Nov. 21, 1973
[21] Appl. No.: 417,943

[52] U.S. Cl............ 260/94.1, 260/2 P, 260/93.5 A, 260/310
[51] Int. Cl. .............................................. C08f 9/00
[58] Field of Search...... 260/94.1, 2 P, 678, 93.5 A, 260/88.3

[56] References Cited
UNITED STATES PATENTS
| | | | |
|---|---|---|---|
| 3,736,297 | 5/1973 | Bracke............................ | 260/94.1 X |
| 3,793,267 | 2/1974 | Bracke............................. | 260/94.1 |
| 3,793,296 | 2/1974 | Bracke............................. | 260/94.1 |

*Primary Examiner*—William F. Hamrock

[57] ABSTRACT

Polymer compositions having a molecular weight above 1,000 and made up of repeating units distributed at random having the formula

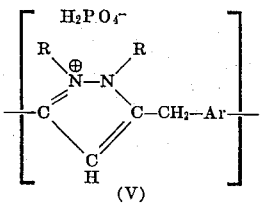
(V)

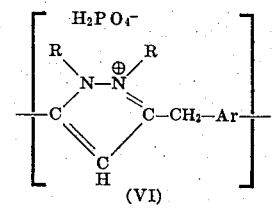

(VI)

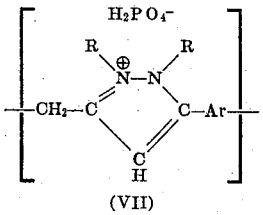

(VII)

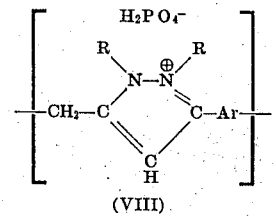

(VIII)

wherein R is selected from the group consisting of hydrogen and monovalent hydrocarbonyl radicals and Ar is a phenylene radical.

10 Claims, No Drawings

PHOSPHATES OF PYRAZOLE POLYMERS

This invention relates to new polymer compositions containing pyrazole units, and to a process for their manufacture.

In copending application Ser. No. 61,849 now abandoned filed on Aug. 6, 1970, there is described polymers having the following repeating units, distributed at random:

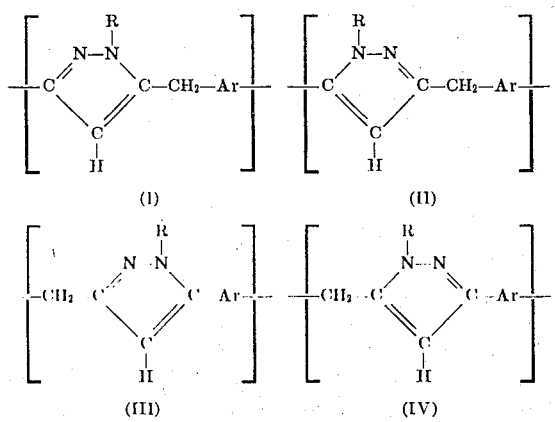

wherein R is hydrogen or a monovalent hydrocarbonyl radical and Ar is a phenylene radical. In these polymers, the linking unit is either in the para or meta position to the phenylene radical. Usually R, if a monovalent hydrocarbonyl radical is an alkyl radical, most often of 1 to 6 carbon atoms, preferably 1 to 3 carbon atoms. The molecular weight of these polymers generally is higher than 1,000 and more often between 1,000 and 100,000. These polymers are quite stable over a substantial range of temperatures. They are formable into films, fibers, coatings and shaped bodies.

For many uses, it has been found desirable to impart self-extinguishing properties to these polymers. This improvement could be obtained by using known fire retardant and extinguishing additives, but such additives generally require special compounding treatments. Moreover, these additives often have a detrimental effect on the mechanical properties of the polymers. Furthermore, the improvement obtained is not lasting.

It is an object of the present invention to provide new polymers containing modified pyrazole units and having self-extinguishing properties.

It is another object of the present invention to provide means for chemically modifying the heretofore disclosed pyrazole-containing polymers.

A further object of this invention is to provide a process for subjecting the heretofore disclosed polymers to a surface treatment without degradation or internal modification of these polymers.

According to the present invention, there are provided polymers containing the following repeating units, distributed at random:

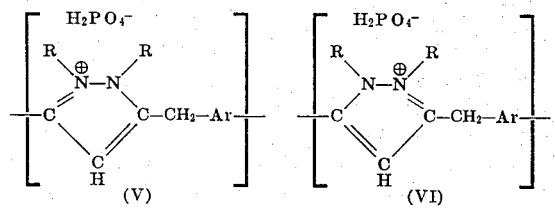

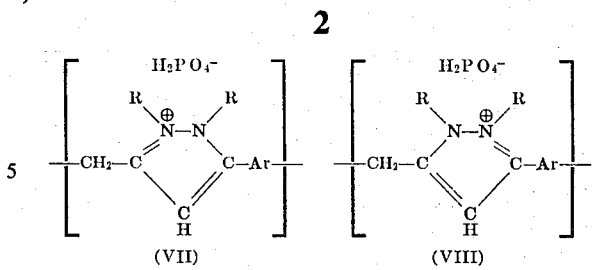

wherein R is hydrogen or a hydrocarbonyl radical and Ar is a phenylene radical, these polymers having a molecular weight higher than 1,000, and wherein the linking units of said polymer are in either para or meta position to said phenylene radical.

In accordance with the present invention, these new polymers are prepared by reacting a pyrazole-containing polymer having the hereinabove given formulas I to IV with a solution of phosphoric acid. By reacting with phosphoric acid, the pyrazole group forms a pyrazolium salt and this reaction occurs without degradation of the polymer chain. The phosphoric acid may be any acid derivated from phosphorous, such as metaphosphoric acid or a condensed phosphoric acid, such as pyro- or di-phosphoric acid. Orthophosphoric acid which is readily available and inexpensive preferably is used.

According to one embodiment of the present invention, the pyrazole-containing polymer of formulas I through IV is dissolved in an inert solvent, such as dimethylsulfoxide, N-methylpyrrolidone, dimethylformamide and the like, an aqueous solution of phosphoric acid added and the mixture stirred at the desired temperature. The reaction temperature may be varied within wide limits, ranging from room temperature to as high as the boiling point of the solvent. Higher temperatures can be used if a pressure vessel is employed. The resulting polymer is then recovered by any suitable method, such as precipitation by a lower aliphatic alcohol such as methanol. In another embodiment, the solution of the starting polymer may be treated by a solution of phosphoric acid in methanol, the modified polymer precipitating as it forms.

Another embodiment of the present invention comprises treating the starting polymer by immersion of the solid polymer in phosphoric acid solution. An aqueous solution of phosphoric acid or, preferably, a solution of phosphoric acid containing a solvent which is capable of swelling the starting polymer, may be used to treat the solid polymer. Solvents capable of swelling the starting polymer include the lower aliphatic alcohols.

The reaction of the present invention is very flexible and the choice of the most convenient means of carrying it out will depend on the physical state of the starting polymer and the choice of the individual carrying out the reaction.

The amount of phosphoric acid to be employed in carrying out the present invention may correspond to about 1 mole of phosphoric acid per pyrazole group in the starting polymer. However, it has been observed that the thermal stability of the resulting polymer is somewhat lower than the starting polymer when each pyrazole unit of the starting polymer has reacted with phosphoric acid. Therefore, the phosphoric acid preferably is used in an amount such that the content of phosphorus linked to the polymer is between 1 and 20%, more particularly between 1 and 10%, preferably between 2 and 6%, based on the weight of polymer.

Using such preferred amount, some of the pyrazole groups of the starting polymer remain unmodified. Such groups may be treated by acylating agents, as described in copending application Ser. No. 215,686 filed on Jan. 5, 1972. In this way, thermally-stable and self-extinguishing polymers are obtained. Such polymers also have other improved properties such as elasticity, and solubility.

The following examples are given to illustrate the present invention:

Example 1

Phosphoric acid was dissolved in methanol in order to obtain a solution containing 5% of $H_3PO_4$. A film of pyrazole-containing polymer similar to formulas I through IV above, but in which R is hydrogen, was immersed in this solution at room temperature for 12 hours. The film was then washed with water and then dried at 150°C. The resulting polymer had a phosphorus content of 2.94%. The mechanical properties of the polymer were only slightly modified by this treatment:

|  | Starting Polymer | Product |
|---|---|---|
| Tensile strength (kg/cm2) | 1,385 | 1,240 |
| Modulus (kg/cm2) | 36,670 | 35,210 |

The polymer resulting from this treatment by $H_3PO_4$ is self extinguishing, according to the UL94 test (Underwriters Laboratories — Subject 94 — Vertical test). According to this test, a film of the final polymer was hung vertically above a flame. When the lower end of the film began to take fire, the flame was removed. Combustion of the film stopped.

Example 2

A pyrazole-containing polymer similar to formulas I through IV above, but in which R is hydrogen, was dissolved in formic acid. The solution contained 1% by weight of polymer. This solution was treated by $H_3PO_4$ (85%), 0.12 ml of acid being used per each gram of polymer. A film of the resulting polymer was cast and dried. The film product contained 4.43% phosphorus and was self-extinguishing (UL94 test).

Example 3

A pyrazole-containing polymer similar to formulas I through IV above, but in which R is hydrogen, was dissolved in dimethylformamide to obtain a 1% solution. This solution was treated with a 20% solution of phosphoric acid in methanol. The resulting polymer was separated by filtration, washed by methanol and dried. The product contained 2.1% phosphorus and was self-extinguishing.

Example 4

A pyrazole-containing polymer similar to formulas I through IV above, but in which R is hydrogen, was treated with phosphoric acid. The product contained 5.1% phosphorus. Films were prepared with this product. The films were respectively treated for several hours by an aqueous soap solution (solution containing 5% of potassium oleate) at 90°C, and a 5% aqueous solution of ammonia, at 70°C. The phosphorous content of the films at time intervals of 5 and 29 hours were as follows:

|  | After 5 hours | After 29 hours |
|---|---|---|
| Soap solution: | 4.43% | 3.89% |
| NH4OH solution: | 4.86% | 4.17% |

What is claimed is:

1. Polymer compositions having a molecular weight above 1,000 and made up of repeating units distributed at random having the formula:

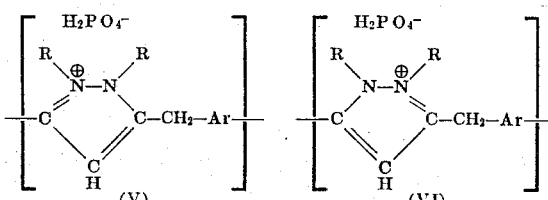

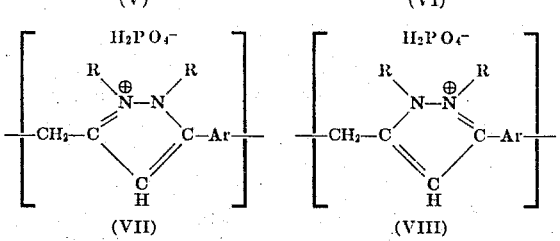

wherein R is selected from the group consisting of hydrogen and monovalent hydrocarbonyl radicals and Ar is a phenylene radical.

2. The polymer compositions of claim 1 wherein the phosphorus content is between 1 and 20%, based on the weight of polymer.

3. The polymer compositions of claim 1 wherein R is hydrogen.

4. The polymer compositions of claim 1 wherein R is an alkyl radical.

5. A process for producing polymer compositions wherein polymers having a molecular weight of at least 1,000 and made up of repeating units, distributed at random, having the formula:

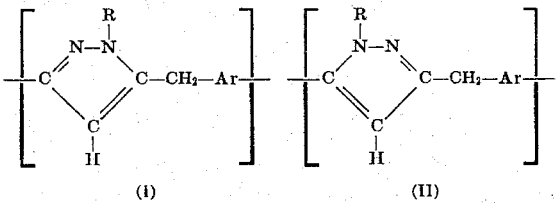

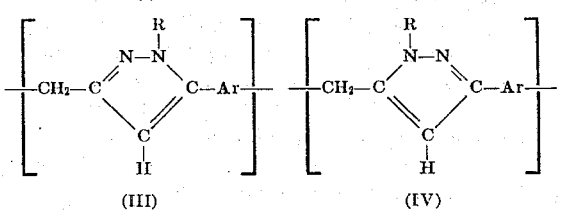

wherein R is a radical selected from the group consisting of hydrogen and monovalent hydrocarbonyl radicals and Ar is a phenylene radical, are treated with a phosphoric acid.

6. The process of claim 3 wherein the phosphoric acid is orthophosphoric acid.

7. The process of producing self-extinguishing polymer compositions having a molecular weight above 1,000, wherein solutions of polymer made up of repeating units, distributed at random, having the formula

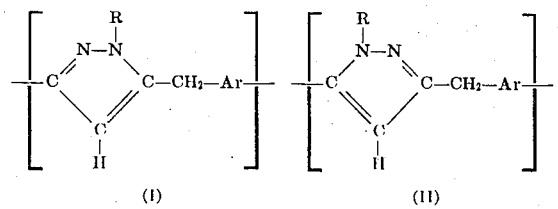

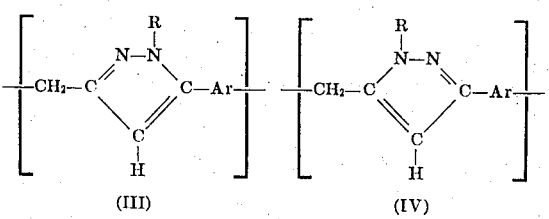

wherein R is a radical selected from the group consisting of hydrogen and monovalent hydrocarbonyl radicals and Ar is a phenylene radical, are treated by an aqueous solution of phosphoric acid and the resulting phosphorus containing polymer compositions are precipitated from the solution by a lower aliphatic alcohol.

8. The process of claim 7 wherein said solutions of polymer are treated by a solution of phosphoric acid in methanol.

9. The process of claim 7 wherein R is hydrogen.

10. The process of claim 7 wherein R is an alkyl radical.

* * * * *